United States Patent
Wright

(10) Patent No.: US 10,251,527 B2
(45) Date of Patent: Apr. 9, 2019

(54) ARTICULATING DUST COLLECTOR FOR CEILING FAN BLADES

(71) Applicant: Korri L. Wright, Yuma, AZ (US)

(72) Inventor: Korri L. Wright, Yuma, AZ (US)

( * ) Notice: Subject to any disclaimer, the term of this patent is extended or adjusted under 35 U.S.C. 154(b) by 0 days.

(21) Appl. No.: 15/640,337

(22) Filed: Jun. 30, 2017

(65) Prior Publication Data

US 2018/0000309 A1  Jan. 4, 2018

Related U.S. Application Data

(60) Provisional application No. 62/357,878, filed on Jul. 1, 2016.

(51) Int. Cl.
| | |
|---|---|
| *A47L 13/38* | (2006.01) |
| *A47L 13/42* | (2006.01) |
| *F04D 29/70* | (2006.01) |
| *A47L 13/253* | (2006.01) |
| *B01D 46/48* | (2006.01) |

(52) U.S. Cl.
CPC .............. *A47L 13/38* (2013.01); *A47L 13/253* (2013.01); *A47L 13/42* (2013.01); *F04D 29/703* (2013.01); *B01D 46/48* (2013.01)

(58) Field of Classification Search
CPC ................................ A47L 13/38; A47L 13/42
USPC .................................... 15/106, 118, 160, 166
See application file for complete search history.

(56) References Cited

U.S. PATENT DOCUMENTS

| | | | | |
|---|---|---|---|---|
| 4,827,556 | A * | 5/1989 | Corsetti | A47L 4/00 15/210.1 |
| 5,313,687 | A * | 5/1994 | Schneider | A47L 7/00 15/394 |
| 5,319,821 | A * | 6/1994 | Nicholson | A46B 15/00 15/104.8 |
| 5,369,836 | A * | 12/1994 | Horne | A47L 4/00 15/210.1 |
| 5,488,754 | A * | 2/1996 | Shadley | A47L 4/00 15/394 |
| 5,765,259 | A * | 6/1998 | Cika | A47L 4/00 15/394 |
| 6,022,192 | A * | 2/2000 | DeLaHoz | F04D 25/088 15/246 |
| 6,345,409 | B1 * | 2/2002 | LaCroix | A47L 9/06 134/21 |

(Continued)

OTHER PUBLICATIONS

Amazon.com: Removable and Washable Microfiber Ceiling and Fan Duster, https://www.amazon.com/gp/product/B01M6E4IVO/?tag=topppinfo-20, site visited Jun. 24, 2018.

*Primary Examiner* — Michael D Jennings
(74) *Attorney, Agent, or Firm* — Charmasson, Buchaca & Leach, LLP

(57) ABSTRACT

The device includes a substantially cylindrical oblong rigid extension member having a distal end upon which is formed an articulatable jaw structure, and an opposite proximal end including a hand-operable trigger for actuating the jaw structure between open and closed positions. A collector sock made from a pliable sheet material can be mounted upon the jaw structure so that the sock enwraps the entire fan blade. The inner surface of the sock surrounding its open end includes a plush surface which can conform to uneven or embossed surfaces on the fan blades so that the sock scrapes off and captures dust and other debris from the fan blade.

10 Claims, 5 Drawing Sheets

(56) References Cited

U.S. PATENT DOCUMENTS

| | | | |
|---|---|---|---|
| 6,782,579 B1 * | 8/2004 | Grimm | F04D 25/088 15/246 |
| 7,363,674 B2 * | 4/2008 | Marshall | A47L 4/00 15/104.94 |
| 7,430,781 B2 * | 10/2008 | Collins | A47L 4/02 15/220.3 |
| 8,734,585 B1 * | 5/2014 | Muncy | A47L 25/00 134/42 |
| 8,826,484 B2 * | 9/2014 | Schultheis | A46B 7/044 15/246 |

* cited by examiner

ARTICULATING DUST COLLECTOR FOR CEILING FAN BLADES

PRIOR APPLICATION

This application claims the benefit of U.S. Provisional Utility Patent Application Ser. No. 62/357,878, filed 2016 Jul. 1, incorporated herein by reference.

FIELD OF THE INVENTION

This invention relates to household cleaning items, and more particularly to devices for removing dust from furniture and other household surfaces such as ceiling fans.

BACKGROUND

Ceiling fan blades often accumulate dust and other debris. The blades are difficult to clean because ceiling fans are often located in relatively inaccessible areas. Thus dusting them can take an inordinate amount of time compared to dusting other, more accessible items in the household. This difficulty often leads the house keeper to forego dusting until a later time, which in turn leads to an even greater accumulation of dust. Greater accumulation of dust can lead to the creating of unsightly dust globs which are difficult for dusters to capture. Uncaptured dust globs can fall from the fan soiling the floor, carpeting or other furniture items beneath the fan. Cleaning with some devices such as a feather duster may dislodge dust globs to fall to the floor.

Another important difficulty in dusting ceiling fan blades concerns safety. Fans are often located high above the floor and may only be accessible by ladder. Housekeepers are often tempted to use more rapid but less secure means for reaching the fan blades. Balancing on wobbly stepping stools, or swivellable chair seats while vigorously wiping the blades can lead to falls causing serious bodily injury.

Therefore, there is a need for a ceiling fan duster which addresses one or more of the above problems or inadequacies.

SUMMARY

The principal and secondary objects of the invention are to provide an improved ceiling fan dust collector. These and other objects are achieved by providing a duster device which articulates to enwrap the fan blade and capture the dust.

In some embodiments the device provides biased contact to both sides and edges of the fan blade in one motion. In some embodiments the device includes a detachable sock commensurately shaped and dimensioned to engage over substantially the entire length of the blade. In some embodiments the sock can be made from an inexpensively manufactured, biodegradable, disposable fabric material. In some embodiments, the sock can include electrostatically charged micro fibers oriented to contact the fan blade surfaces during use.

The original text of the original claims is incorporated herein by reference as describing features in some embodiments.

DESCRIPTION OF THE EXEMPLARY EMBODIMENTS

Figure 1:
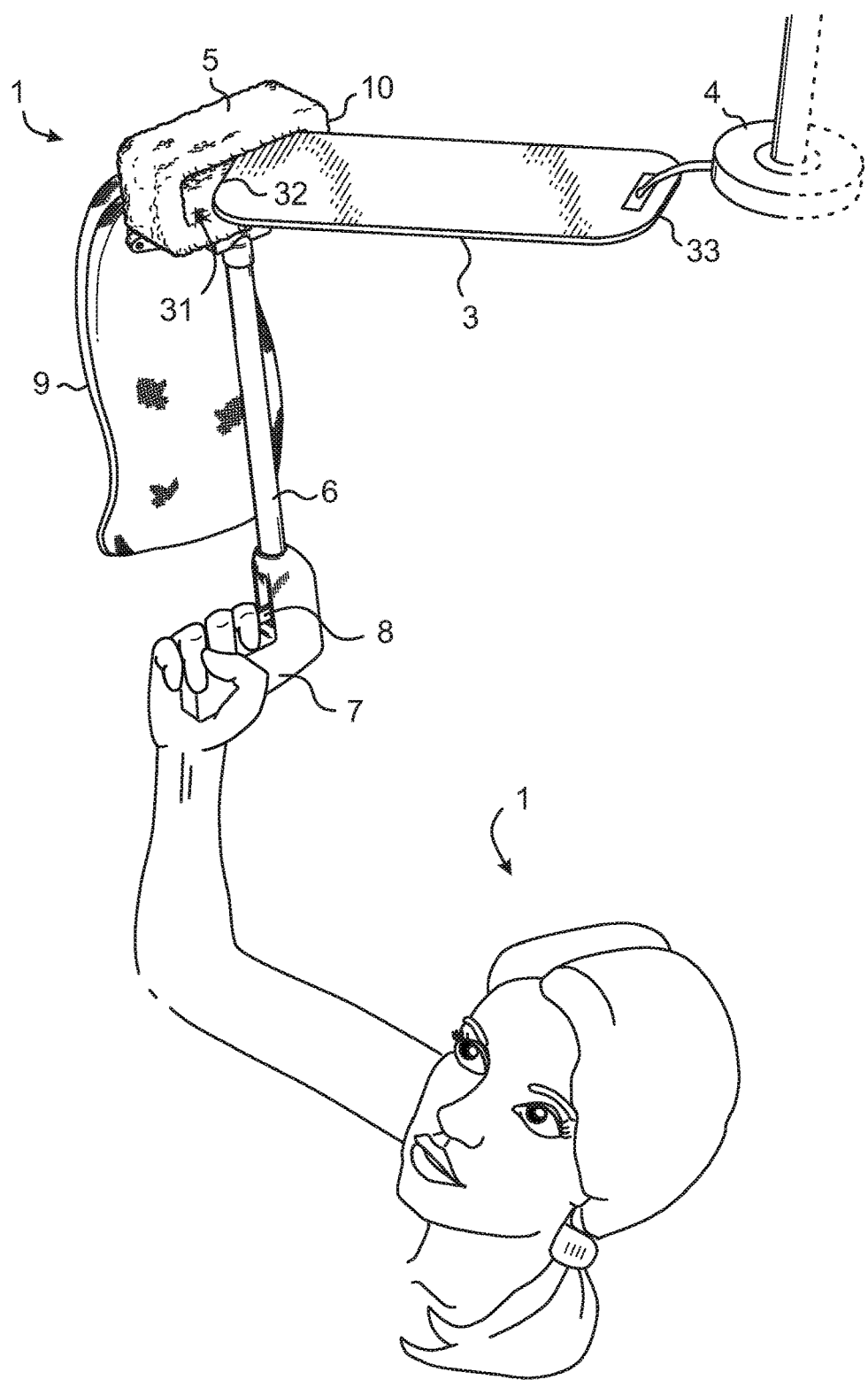
FIG. 1 is a diagrammatic perspective view of an articulating dust collector for ceiling fan blades according to an exemplary embodiment of the invention being operated by a user.
Figure 2:
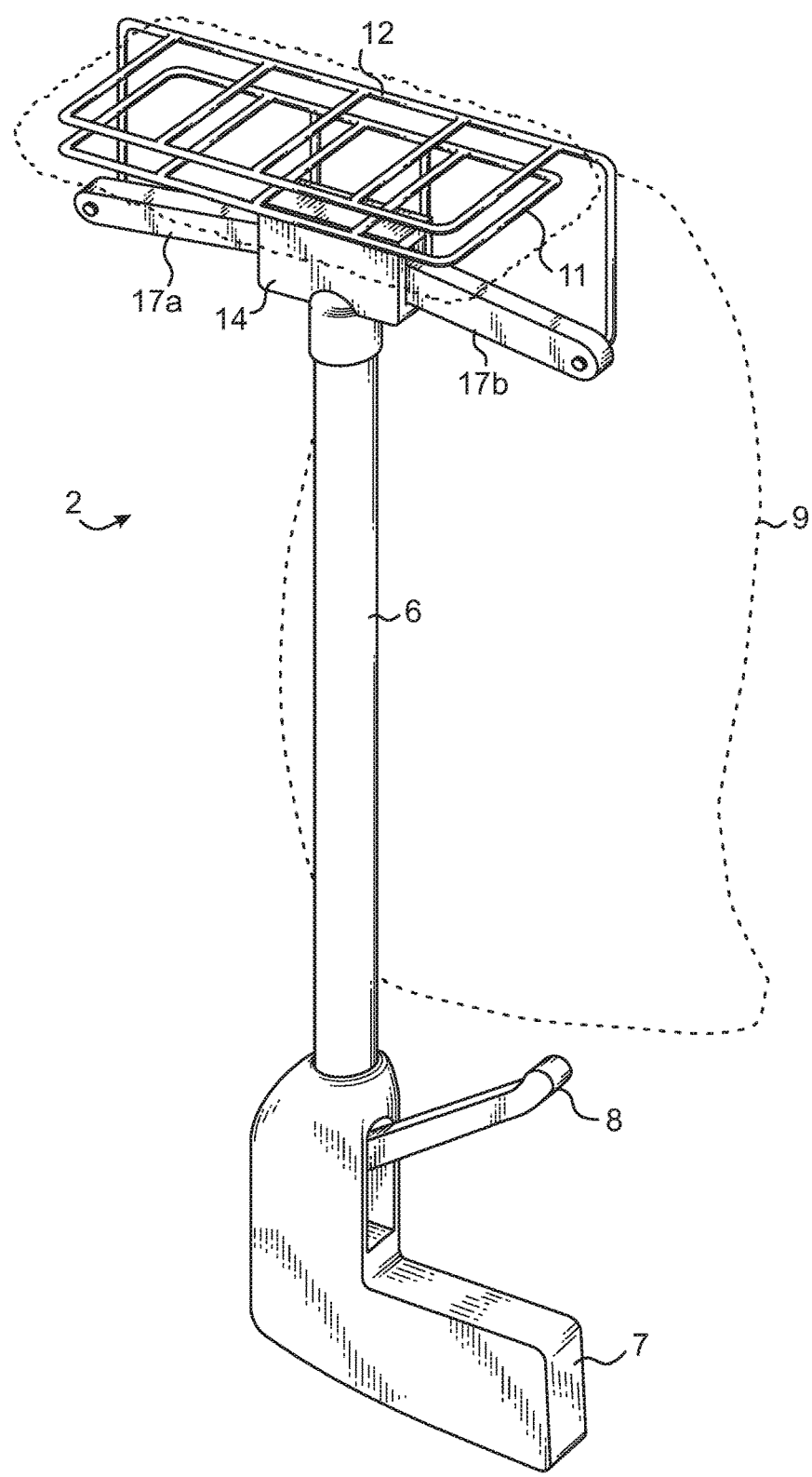
FIG. 2 is a diagrammatic front, top, left perspective view of the articulating dust collector including the collector sock shown in dashed lines.
Figure 3:
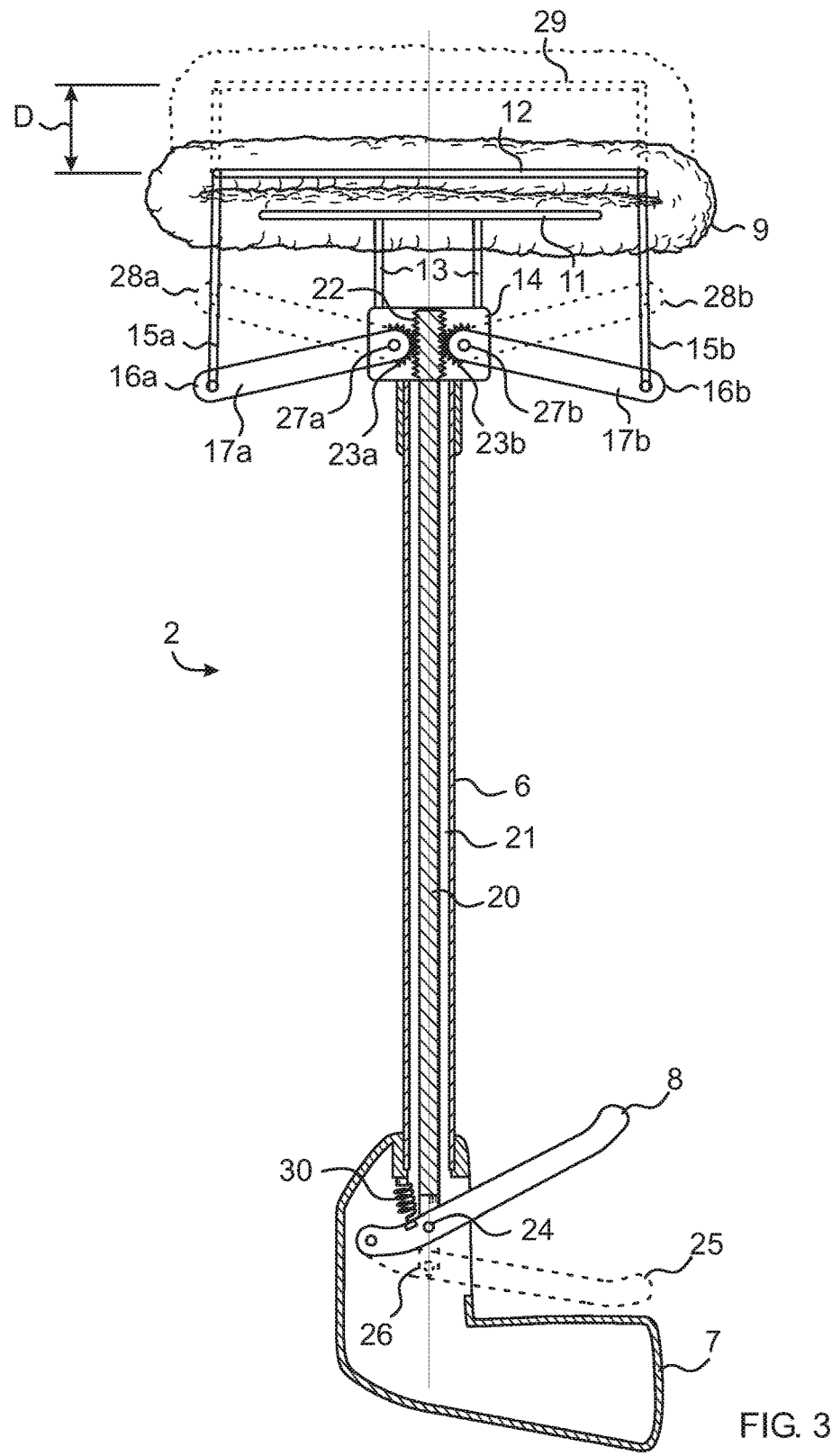
FIG. 3 is a diagrammatic partial cross-sectional front view of the articulating dust collector of FIG. 2.

Referring now to FIGS. 1-3 there is shown a user 1 cleaning a blade 3 of a ceiling fan 4 using an articulating dust collector 2 according to an exemplary embodiment of the invention. The articulating dust collector includes an openable jaw structure 5 located on the distal end of a hollow, oblong, extension arm 6. The proximal end of the extension arm has a handle 7 which can be grasped by the single hand of the user, and a trigger 8 for activating a jaw opening and closing mechanism within the collector. A collector sock 9 has its open end 10 secured to the jaw structure.

The jaw structure 5 includes a pair of opposing, parallelly spaced apart paddles 11,12 that separate from each other when the jaw structure is in the open position and come together in the closed position. The bottom paddle 11 can be fixed by a pair of support struts 13 to a housing 14 secured to the distal end of the extension arm 6. A second pair of support struts 15a,15b extend between the top paddle 12 and a pair of moveable flippers 17a,17b hingedly attached to the housing. The support struts of the upper paddle 15a,15b are fixed the opposite lateral edges of the upper paddle and hingedly connect to the laterally distal ends 16a,16b of the flippers.

The flippers 17a,17b can be driven to swing between a lower position shown in solid lines in the drawing, and an upper position shown in dashed lines in the drawing, by a drive mechanism carried within the collector 2. The drive mechanism includes a rigid post 20 extending from the handle 7 to the housing 14 through the central lumen 21 of the extension arm 6. The proximal end of the post can be hingedly connected 24 to the trigger 8. The distal end of the post can have an array of axially spaced apart teeth 22 engaged by the geared laterally proximal ends 23a,23b of the flippers. In this way when the trigger is depressed 25, the post moves downwardly 26, in an axially proximal direction. This causes the toothed distal end of the post to move across the laterally proximal ends of the flippers, causing the flippers to rotate about pivot points 27a,27b, driving the flipper distal ends toward their upper position 28a,28b. This causes the top paddle 12 to move upwardly a distance D, in the axially distal direction, to an upper position 29, so that the jaw is in its open position. A spring 30 biases the trigger and thus the jaw toward the closed position.

In this way, referring back to FIG. 1, when the jaw is in the open position, the open end of the attached sock 9 forms an open maw 31. The maw can then be journaled endwise over the cantilevered fan blade 3 until the blade is substantially fully contained within the sock. In other words, the maw can be moved from the free end 32 of the blade to its attached end 33. Once the sock opening has reached the attached end the user can release the trigger, allowing the maw to close, contacting the sock opening against the blade. When the maw is withdrawn from the blade in the opposite journaling motion, the internal surfaces of the sock scrape against the blade and dislodge and capture the dust and other debris that has accumulated on the blade. The process can be repeated to dislodge stubborn debris. Because the jaws are biased toward the closed position, less skill is required to provide an adequate clamping force on the top and bottom surfaces of the blade. In this way, the device can both dust and capture dust globs which do not adhere to the inwardly facing sock surfaces surrounding the maw.

Figure 4:
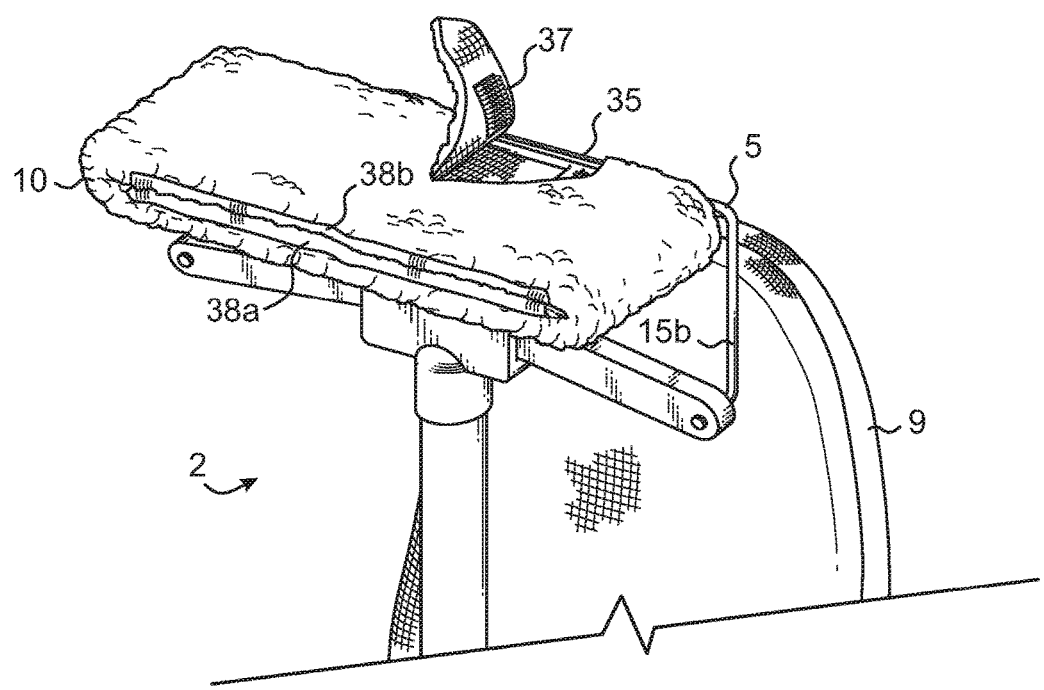
FIG. 4 is a partial, diagrammatic front, top, left perspective view of the jaw structure of an articulating dust collector showing various sock attachment features.

As shown in FIG. 4, the open end 10 of the sock 9 can be releasably secured to the jaw structure 5 of the collector 2 in various ways. A first way involves the sock having a circumferential elastic band 35 or drawstring surrounding the opening which when folded back upon itself cinches around the base of the jaw paddles near the supporting struts (only 15b shown). Alternately, patches 37 of Velcro brand hook-and-loop fabric fastener, or other common fasteners. In this way the sock can be detached from the collector for cleaning, such as in a clothes washing machine, or disposal, and replaced with a clean sock. The sock can be made from a durable, flexible sheet material such as fabric, or other commonly available, and readily manufacturable sheet material. Alternately, the sock can be made from an inexpensive, disposable sheet material such as breathable polypropylene fabric. The inner surfaces of the maw can include panels 38a,38b of electrostatic, dust adhering fibers to help capture fine particles of dust.

Figure 5:
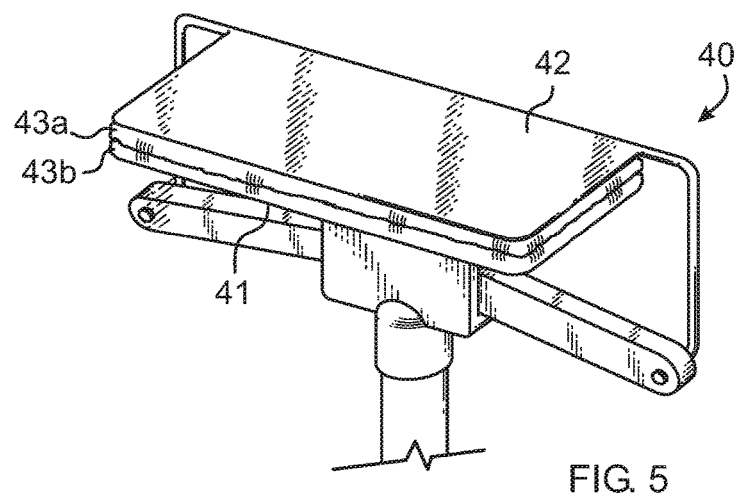
FIG. 5 is a partial, diagrammatic front, top, left perspective view of the jaw structure of a sockless articulating dust collector according to an alternate exemplary embodiment of the invention.

Referring now to FIG. 5, there is shown an alternate embodiment of articulating dust collector 40 wherein the inner surfaces of the upper and lower paddles 41,42 are solid and can carry pair of opposing panels 43a,43b of electrostatic, dust adhering fibers. In this embodiment the dust will adhere to the panels and there is no need for the sock. This adaptation of the device can be used for more frequent uses where only a light film of dust has accumulated.

Figure 6:
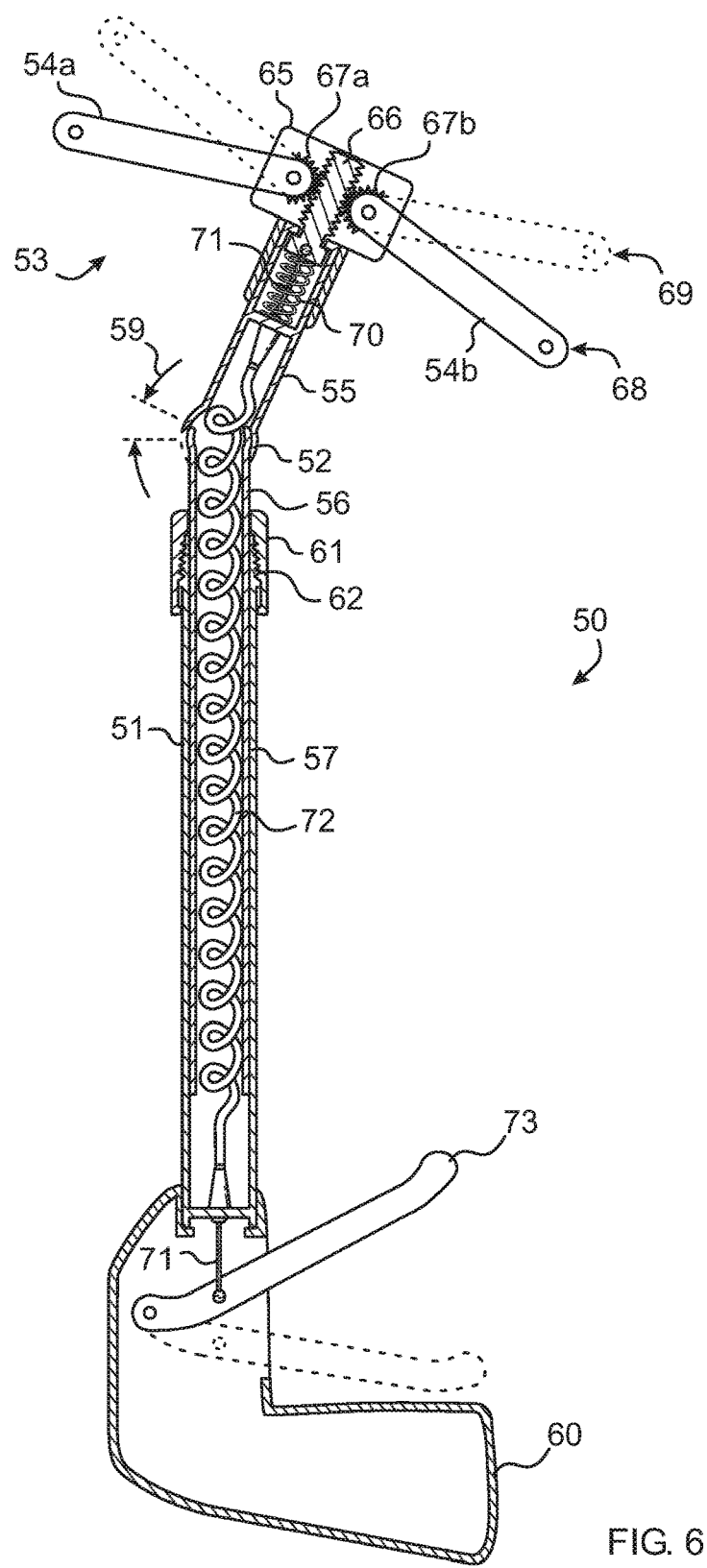
FIG. 6 is a diagrammatic partial cross-sectional front view of the jaw structure of an articulating dust collector according to an alternate exemplary embodiment having a telescoping and angularly adjustable extension arm.

Referring now to FIG. 6 there is shown an alternate embodiment of articulating dust collector 50 which allows for a telescoping extension arm 51 which also provides for an angularly adjustable jaw structure 53. For clarity, the jointed connection 52 between the extension arm pieces shows the jaw structure pivoting in the same plane of movement as the flippers 54a,54b. Those skilled in the art will readily recognize that other planes of movement may be preferable for enhanced function of the collector.

The extension arm 51 can include three rigid pieces, namely, a top piece 55, a medial piece 56, and a base piece 57. The top piece includes a distal end connected to the jaw structure 53, and a proximal end connected to the joint 52. The medial piece 56 has a distal end connected to the joint, and a proximal end portion the telescopingly engaging the base piece 57. The base has a distal end engaged by the medial piece, and a proximal end connected to the handle 60.

The joint 52 can be a ball-in-socket-type, universal joint, which allows limited angular adjustment 59 of the position of the top piece 55, and thus the jaw structure 53, with respect to the medial piece 56, and thus the handle 60. The joint can have a friction fit so that it retains its angular positioning unless sufficient force is used to alter it, or can use other well known means to secure its orientation.

The axial length of the extension arm 51 can be adjusted by telescopingly moving the axial location of the medial piece 56 with respect to the base piece 57. The relative positioning of the medial and base pieces can be releasably fixed by tightening a screw-based compression collar 61 engaging the split threaded distal end 62 of the base piece, which clamps the inner surface of the base piece onto the outer surface of the medial piece.

The movement of the flippers 54a,54b between a retracted position 68 and an extended position 69 corresponding to the closed and open positions of the jaw respectively, are controlled similarly to the embodiment of FIG. 3. The flippers are hingedly mounted to a housing 65 secured to the distal end of the top piece 55 of the extension arm 51. An axially movable toothed post 66 engages the geared proximal ends 67a,67b of the flippers. The flippers are biased toward the retracted position by a compression spring 70 urging the toothed post upward in the distal direction. The bias of the post can be overcome by a force applied to the post by a cable 71 running within a coiled, flexible conduit 72 connected to the trigger 73 in the handle 60.

Although the above utilitarian aspects have been described in connection with a hand-manipulable ceiling fan blade duster, it shall be understood that the duster can easily be adapted to include automated and/or motorized elements.

While the preferred embodiments of the invention have been described, modifications can be made and other embodiments may be devised without departing from the spirit of the invention and the scope of the appended claims.

What is claimed is:

1. A ceiling fan blade duster apparatus comprises:
   an elongated member;
   a pliable sock comprising an open end;
   an articulatable jaw structure connected to a first end of said member, said articulatable jaw structure being moveable between a closed position and an open position;
   said jaw structure comprising a pair of opposing inner surfaces;
   said opposing inner surfaces being oriented to contact top and bottom surfaces of said blade when said jaw is in a closed position;
   an activation trigger connected to an opposite end of said member;
   a jaw manipulation mechanism responsive to said trigger for moving said jaw between said open and closed position;
   wherein said open end of said sock is releasably mounted to said jaw structure, whereby said open end forms a maw when said articulatable jaw structure is in said open position;
   wherein said maw includes inwardly facing sock surfaces forming said opposing inner surfaces of said jaw;
   wherein said maw is shaped an dimensioned to slip over said fan blade in an endwise manner; and,
   wherein said elongated member comprises:
   a top piece;
   a medial piece;
   a base piece;
   said top piece connected to said jaw structure;
   said top piece pivotably connected to said medial piece at a joint; and,
   said medial piece telescopingly connected to said base piece.

2. The apparatus of claim 1, wherein said jaw structure further comprises a pair of contact pads supporting said maw.

3. The apparatus of claim 1, wherein said sock further comprises a closed end opposite said open end.

4. The apparatus of claim 3, wherein said closed end is reversably openable.

5. The apparatus of claim 1, wherein said sock comprises a bag portion defining an internal chamber shaped and dimensioned to accommodate substantially the entire length of said blade therein.

6. The apparatus of claim 1, wherein said jaw manipulation mechanism is biased toward said closed position.

7. The apparatus of claim 1, wherein said sock comprises a patch of dust attracting material located on at least one of said inwardly facing sock surfaces.

8. The apparatus of claim 1, wherein said apparatus further comprises a handle located at said opposite end, and wherein said trigger is a spring-loaded, hand-manipulable lever.

9. The apparatus of claim 1, wherein said articulatable jaw structure comprises a pair of substantially planar stratiformly arranged, parallelly separatable paddles.

10. The apparatus of claim 9, wherein said paddles are overcomably biased toward each other.

\* \* \* \* \*